Patented Feb. 12, 1946

2,394,752

UNITED STATES PATENT OFFICE 2,394,752

ISOMERIZING HYDROCARBONS

Chester C. Crawford, El Cerrito, and William E. Ross, Berkeley, Calif., assignors to Shell Development Company, San Francisco, Calif., a corporation of Delaware No Drawing. Application January 30, 1942, Serial No. 428,852

10 Claims. (Cl. 260—683.5)

The present invention relates to the catalytic isomerization of hydrocarbons and relates more particularly to an improved process for the conversion of normal or branched chain saturated hydrocarbons having at least four carbon atoms to the molecule to branched and more highly branched chain saturated hydrocarbons.

The aluminum halides are known to catalyze the isomerization of hydrocarbons. Because of its availability and relatively lower cost the use of the chloride is generally preferred. Aluminum chloride per se, however, even in the presence of a hydrogen halide promoter, is not entirely satisfactory as a catalyst for large scale hydrocarbon isomerization. The rate at which isomerization can be effected in its presence at relatively low temperatures is usually too slow for practical consideration. At higher temperatures this catalyst tends to promote degradation reactions which lead to the formation of by-products which, even when formed in relatively small quantities, coat the aluminum chloride, thereby preventing effective contact of the catalyst and the hydrocarbon being treated and causing the catalyst to agglomerate into a sticky mass. Supported aluminum chloride catalysts, although more advantageous in many respects than the use of the aluminum chloride per se, have certain disadvantages. Thus the available degree of contact between reactants and catalyst is generally insufficient to enable operations in the liquid phase. This is particularly important in view of the fact that the isomerization of hydrocarbons having more than four carbon atoms to the molecule is generally effected more advantageously in the liquid phase. A further disadvantage often inherent in the use of solid catalysts resides in the difficulty of efficiently controlling the catalyst bed temperature due to the poor heat conductivity of most of the available solid isomerization catalysts. Since the supported catalysts comprise a considerable quantity of inert support material, their use requires large reaction zones relative to the amount of active catalyst constituent contained therein. The sludge type catalysts, such as organic aluminum chloride complexes, have a relatively limited field of application and their use often entails serious difficulties in the handling of the catalyst within the system.

It has now been found that saturated hydrocarbons can be isomerized efficiently with the aid of a purely inorganic catalyst in the liquid state. In accordance with the process of the invention, the hydrocarbon to be isomerized, alone or in admixture with one or more hydrocarbons which may or may not be capable of isomerization under the conditions of execution of the process, and/or in the presence of one or more non-hydrocarbon inert diluents, is contacted under isomerization conditions of temperature and pressure with a molten ternary mixture comprising aluminum chloride, sodium chloride and zinc chloride. The catalyst melt preferably comprises the aluminum chloride, sodium chloride and zinc chloride in a molar ratio of about 3:1:1, respectively. This melt is not only effective in its ability to catalyze the isomerization of hydrocarbons, but maintains its fluidity at temperatures below about 80° C., thereby enabling its use for the isomerization of hydrocarbons such as, for example, pentane, which are substantially completely decomposed in the presence of most aluminum chloride catalysts at temperatures above about 110° C. The ability of the catalyst melt to maintain its fluidity at a relatively low temperature permits the efficient treatment of hydrocarbons in the liquid phase at temperatures at which such treatment would be economically unfeasible, if not impossible, with the use of a solid catalyst or a molten catalyst of higher melting point. Increased catalyst life, resulting from curtailment of hydrocarbon degradation, and the possibility of attaining equilibrium mixtures containing higher proportions of isoparaffins to normal paraffins at the lower temperatures, taken together with the ease with which the process can be carried out at these lower temperatures due to the fluidity of the catalyst melt, contribute considerably to offset the apparent advantage of the more rapid isomerization rates obtained at higher temperatures.

The cumulative advantages as isomerization catalyst of the melt employed in the process of the invention are not possessed by any single or any two of the components separately. Neither sodium chloride nor zinc chloride nor a mixture of the two are satisfactory isomerization catalysts. Aluminum chloride per se has too high a melting point and is too volatile to permit its use in the molten state. A binary mixture consisting of aluminum chloride and sodium chloride, though possessing catalytic activity when the aluminum chloride is in a sufficient molecular excess, is also too high melting to permit its efficient use in the liquid state. The eutectic of aluminum chloride-sodium chloride melts at a temperature above about 120° C. Since the maintenance of a mixture at its exact eutectic composition during operation of the process is extremely difficult and since the process must be executed at a temperature above the melting point of the mixture to avoid freezing of the catalyst within the system, it is apparent that such a high melting mixture cannot be used effectively for the isomerization of paraffin hydrocarbons, particularly those having at least five carbon atoms to the molecule. Certain binary mixtures of aluminum chloride and zinc chloride, because of the supercooling effect of the latter component, maintain a certain degree of fluidity at relatively low temperatures. These mixtures, in addition to other disadvantages, generally are not homogeneous at temperatures substantially below about 150° C. Below this temperature a separation and freezing of part of the catalyst within the system will be encountered, which not only affects adversely any activity which they possess but causes mechanical difficulties which would prevent their efficient use.

Though an important advantage of the process of the invention resides in its use at relatively low temperatures, it is to be understood that it is not limited thereto and may be advantageously employed at higher temperatures, for example, up to about 150° C. for the isomerization, preferably in the vapor phase, of the less readily degraded saturated hydrocarbons such as butane. In the higher temperature range greater variations in the percentage composition of the catalyst melt may be tolerated. The aluminum chloride should always be present in molecular excess, however, and the zinc chloride content is preferably not permitted to exceed about 22 mol per cent of the melt. Preferred melts which may be used in the higher temperatures are those comprising the aluminum chloride, sodium chloride and zinc chloride within the following range in mol per cent: $AlCl_3$, 56–70; $NaCl$, 16–22; $ZnCl_2$, 14–22. The proportions of the components of melts as given throughout the specification and claims refer to the amounts in which these are mixed to obtain the catalyst and once they are mixed they combine in part with one another to form complex compounds. It is to be pointed out that substantial advantages are, however, inherent in the use, at the higher temperatures, of the preferred catalyst melt comprising the $AlCl_3$, $NaCl$ and $ZnCl_2$ in the molecular ratio of about 3:1:1, respectively.

The advantages in the use at the higher temperatures of the ternary melts employed in the process of the invention over higher melting mixtures comprise a greater degree of fluidity, assuring contact of reactants and catalyst, and a greater facility in the handling of the reaction mixture within the system. The use of the lower melting catalysts permits greater variations in catalyst composition without the danger of freezing part of the catalyst in the reaction zone. This increased range in permissible catalyst composition also permits the properties of the melt, such as its catalytic activity, to be modified to a greater degree. This is highly advantageous since it is often desirable to modify the activity of a catalyst melt in conformity with changes in operating conditions or changes in the hydrocarbon feed to the process.

Since pentane is particularly prone to undergo decomposition at higher temperatures in the presence of aluminum chloride catalysts, the process of the invention may be applied with particular advantage to the conversion of this hydrocarbon to isopentane. However, as stated above, the invention may advantageously be applied to the isomerization of the more stable paraffinic hydrocarbons such as, for example, butane. The invention is not limited to the treatment of materials consisting essentially of a single hydrocarbon. Thus the process of the invention may be applied to the treatment of hydrocarbon mixtures comprising normal butane and/or normal pentane. For example, suitable starting materials are saturated hydrocarbon mixtures comprising, besides a substantial amount of normal butane and/or normal pentane, one or more other saturated hydrocarbons which may or may not be capable of isomerizing under the conditions of execution of the process. The invention thus provides a practical process for converting the normal butane and normal pentane contents of commercial saturated hydrocarbon fractions obtained from such sources as natural gas, products of thermal and catalytic hydrocarbon conversion operations, etc., to their branched chain isomers. Especially suitable mixtures of hydrocarbons are the so-called butane-butylene fractions and pentane-amylene fractions from which unsaturated hydrocarbons have been removed to at least a substantial degree. Treatment of the mixtures obtained, for instance as by-products in the sulfuric acid alkylation of isoparaffins, results in materially increasing their content of branched chain isomers and converting them to suitable raw materials for re-use in the alkylation process. The process of the invention is, however, in no wise limited to the treatment of normal butane and/or pentane or saturated hydrocarbon mixtures containing them. The process may be applied generally to the catalytic isomerization of any isomerizable saturated hydrocarbon. While the process is particularly adapted to the isomerization of saturated open chain or paraffin hydrocarbons, it may be applied to the treatment of isomerizable naphthenic hydrocarbons such as, for example, methyl cyclopentane, dimethyl cyclopentane, and methyl cyclohexane.

The process of the invention may also be applied to the treatment of hydrocarbon fractions comprising substantial amounts of isomerizable saturated hydrocarbons, such as, for example, fractions of straight run gasoline, casing head gasoline, etc., to improve their ignition characteristics or to obtain products suitable for alkylation with olefins. Due to the relatively low temperatures at which the catalyst can be maintained in the fluid state, the process enables the treatment of these fractions in the absence of any substantial hydrocarbon decomposition. Thus the treatment of 70° C. end point natural gasoline at a temperature of about 80° C. increased the octane number about 10 to 11 points.

The process of the invention may be executed at temperatures ranging from the minimum temperature at which the catalyst can be maintained in the liquid state up to about 150° C. When isomerizing hydrocarbons having at least five carbon atoms to the molecule, such as, for example, pentane, temperatures in the range of from about 80° C. to about 100° C. are preferably used. When isomerizing butane, temperatures below 150° C. are preferably employed.

The process of the invention can be effected in the vapor or liquid phase. Hydrocarbons having at least five carbon atoms to the molecule, such as, for example, pentane, are preferably isomerized in the liquid phase whereas butane may be isomerized in the vapor phase. When the isomerization is executed in the liquid phase, the pressure is of course always sufficiently high to maintain at least a substantial portion of the hydrocarbon feed in the liquid phase. In vapor phase operation of the process, pressures ranging from about atmospheric up to about 250 pounds are usually most advantageously employed. Higher pressures may, however, be used.

The hydrocarbon or hydrocarbon mixtures treated are preferably substantially free of materials which undergo side reactions such as degradation, polymerization, etc., or which combine with components of the catalyst melt under the conditions of execution of the process. Olefins, diolefins, aromatic hydrocarbons or other detrimental impurities in the hydrocarbon or hydrocarbon mixture to be treated are preferably removed prior to isomerization by a suitable pretreatment which may comprise one or more of such steps as mineral acid refining, hydrogenation, alkylation, contact with clay or a part of the spent catalyst, solvent extraction, etc.

Gases such as $H_2$, $N_2$, $CH_4$, $CO_2$, etc., may if desired be present in the reaction zone. When such gases are separately charged to the system they may be preheated prior to their introduction into any part of the reaction zone to thereby aid in maintaining the reaction temperature.

The isomerization is preferably executed in the presence of a hydrogen halide promoter such as, for example, hydrogen chloride. This may be admixed with the hydrocarbon charge prior to its introduction into the reaction zone or may be passed in part or in its entirety directly into the reaction zone at one or a plurality of intermediate points thereof. The amount of hydrogen halide used may vary widely in accordance with operating conditions. In general, an amount of hydrogen chloride equal to from about 0.3% to about 10% of the hydrocarbon charge is found to be sufficient. Higher proportions of the hydrogen halide may, however, be used.

The process of the invention is carried out in a batch, intermittent or continuous manner. A suitable reaction zone enabling efficient contact of the liquid catalyst and the hydrocarbon charge may be used. The reaction zone may comprise, for example, one or a plurality of reaction chambers containing the catalyst melt. These reactors may be connected in parallel or in series and provided with suitable means for stirring the contents and maintaining the reaction temperature therein. If desired, the reaction zone may comprise an elongated reaction zone of restricted cross-sectional area, such as an externally heated coil positioned in a furnace structure, through which an admixture of hydrocarbon feed admixed with the catalyst melt may be passed. Effluence from the reaction zone may be passed to a suitable separating zone from which entrained catalyst may be separately withdrawn and returned to the reaction zone. Hydrogen halide and unconverted hydrocarbons are separated from the reaction products and may be recycled in part or in their entirety to the inlet or any intermediate part of the reaction zone. If desired, the effluence from the reaction zone may be directly combined with olefinic hydrocarbons and subjected to alkylating conditions to effect the alkylation of the branched chain hydrocarbons with olefinic hydrocarbons.

The following examples are given to illustrate the process of the invention; it is to be understood, however, that the values given are illustrative rather than limiting.

Example I

Normal butane was treated in a continuous operation with a catalyst melt consisting of $AlCl_3$, NaCl, and $ZnCl_2$ in a mol ratio of 3:1:1, respectively, at a temperature of 80° C. and at a pressure of 300 pounds gauge. The feed rate was maintained at 1.11 kg. of charge per liter of reaction space per hour. Hydrogen chloride was added in the amount of 3% of the hydrocarbon charge. An overall conversion of butane to isobutane of 26% was obtained for 39 hours of continuous operation.

Example II

Normal butane in admixture with about 4 per cent by weight of hydrogen chloride was treated for 30 minutes with a catalyst melt consisting of $AlCl_3$, NaCl, and $ZnCl_2$ in a molar ratio of 3:1:1, respectively, at a temperature of 110° C. in a closed reactor. A conversion of normal butane to isobutane of 52 per cent was obtained.

Example III

Normal butane was treated under the conditions of Example II with the exception that the time of contact was reduced to 15 minutes and the hydrogen chloride content was reduced to about 1.3 per cent by weight of the charge. A conversion of normal butane to isobutane of 42 per cent was obtained.

Example IV

70° C. end point stabilized natural gasoline having an octane number of 73 was treated by passage through a mixer-type reactor containing 642 grams of a catalyst melt consisting of $AlCl_3$, NaCl and $ZnCl_2$ in a mol ratio of 3:1:1, respectively. The process was executed at a temperature of 80° C. and at a pressure of from 200 to 250 pounds gauge. Hydrogen chloride was added to the hydrocarbon charge in an amount of about 3 per cent by weight. The charge was passed through the reactor at a rate of about 1600 grams per hour. A product having an octane number of 83 was obtained.

We claim as our invention:

1. A process for converting pentane to isopentane which comprises contacting pentane in the liquid phase with a fluid melt comprising aluminum chloride, sodium chloride and zinc chloride in a molar ratio of about 3:1:1 respectively, at a temperature not exceeding about 100° C.

2. A process for converting normal and branched chain paraffin hydrocarbons having at least five carbon atoms to the molecule to branched and more highly branched paraffin hydrocarbons which comprises contacting the hydrocarbon in the liquid phase with a fluid melt comprising aluminum chloride, sodium chloride and zinc chloride in a molar ratio of about 3:1:1 respectively, at a temperature not exceeding about 100° C.

3. A process for isomerizing saturated hydrocarbons which comprises contacting an isomerizable saturated hydrocarbon having at least five carbon atoms to the molecule in the liquid phase with a fluid melt comprising aluminum chloride, sodium chloride and zince chloride in a molar ratio of about 3:1:1 respectively, at a temperature not exceeding about 100° C.

4. A process for isomerizing hydrocarbons which comprises contacting a hydrocarbon fraction comprising isomerizable saturated hydrocarbons having at least five carbon atoms to the molecule in the liquid phase with a fluid melt comprising aluminum chloride, sodium chloride and zinc chloride in a molar ratio of about 3:1:1 respectively, at a temperature not exceeding about 100° C.

5. A process for converting a normal or branched chain paraffin hydrocarbon to a branched or more highly branched chain paraffin hydrocarbon which comprises contacting the hydrocarbon under isomerizing conditions with a fluid melt comprising aluminum chloride, sodium chloride and zinc chloride in a molar ratio of about 3:1:1 respectively.

6. A process for isomerizing saturated hydrocarbons which comprises contacting an isomerizable saturated hydrocarbon under isomerizing conditions with a fluid melt comprising aluminum chloride, sodium chloride and zinc chloride in a molar ratio of about 3:1:1 respectively.

7. A process for converting normal butane to isobutane which comprises contacting normal butane under isomerizing conditions with a fluid melt comprising aluminum chloride, sodium chloride and zinc chloride in a molar ratio of about 3:1:1 respectively.

8. A process for converting a normal or branched chain paraffin hydrocarbon to a branched or more highly branched chain paraffin hydrocarbon which comprises contacting the hydrocarbon under isomerizing conditions with a fluid melt comprising aluminum chloride, sodium chloride and zinc chloride.

9. A process for isomerizing saturated hydrocarbons which comprises contacting an isomerizable saturated hydrocarbon under isomerizing conditions with a fluid melt comprising aluminum chloride, sodium chloride and zinc chloride.

10. A process for isomerizing saturated hydrocarbons which comprises contacting an isomerizable saturated hydrocarbon in the presence of a promoting amount of a hydrogen halide under isomerizing conditions with a fluid melt comprising aluminum chloride, sodium chloride and zinc chloride.

CHESTER C. CRAWFORD.
WILLIAM E. ROSS.